United States Patent Office 3,374,264
Patented Mar. 19, 1968

3,374,264
N-HALOACETYL-ANTHRANILIC ACIDS AND ESTERS
Milan Radoje Uskokovic, Montclair, and Wilhelm Wenner, Upper Montclair, N.J., assignors to Hoffmann-La Roche Inc., Nutley, N.J., a corporation of New Jersey
No Drawing. Original application Oct. 4, 1962, Ser. No. 228,256, now Patent No. 3,261,828, dated July 19, 1966. Divided and this application July 27, 1965, Ser. No. 475,267
10 Claims. (Cl. 260—471)

The following application is a division of application Ser. No. 228,256, filed Oct. 4, 1962, now Patent No. 3,261,828.

This invention relates to novel fused heterocyclic ring compounds, as well as novel intermediates used in their preparation and methods for their preparation. More particularly, the novel compounds of this invention are reduction products of 3H-1,4-benzodiazepine-2,5(1H, 4H)-diones. Specifically, the novel reduction products of this invention are 1H-2,3-dihydro-1,4-benzodiazepines of the formula:

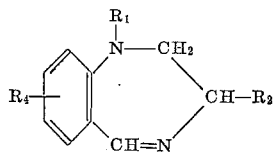
I and 1H-2,3,4,5-tetrahydro-1,4-benzodiazepines of the formula:

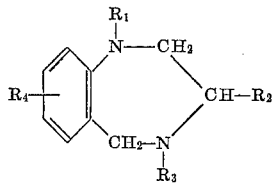
II wherein $R_1$ is selected from the group consisting of hydrogen, lower alkyl, aryl-lower alkyl, nitroaryl-lower alkyl and cyclo-lower alkyl-lower alkyl; $R_2$ and $R_3$ are each selected from the group consisting of hydrogen and lower alkyl; and $R_4$ is selected from the group consisting of hydrogen and halogen.

The compounds of the invention above form acid addition salts with both organic and inorganic acids, and such acid addition salts are within the scope of the present invention. More specifically, they form pharmaceutically acceptable acid addition salts with medicinally acceptable acids, both organic and inorganic, such as, for example, hydrochloric acid, hydrobromic acid, nitric acid, phosphoric acid, sulfuric acid, carbonic acid, acetic acid, formic acid, succinic acid, maleic acid, methanesulfonic acid, toluenesulfonic acid, and the like.

As used in this description, the term lower alkyl includes both straight and branched chain saturated hydrocarbon groups such as methyl, ethyl, propyl, isopropyl, butyl, and the like. In the terms aryl-lower alkyl, nitroaryl-lower alkyl and cyclo-lower alkyl-lower alkyl, the lower alkyl group is of the same character. Thus, for example, the term aryl-lower alkyl includes groups such as benzyl and the term nitroaryl-lower alkyl includes groups such as nitrobenzyl. Moreover, the term cyclo-lower alkyl-lower alkyl includes groups such as cyclohexylmethyl. The term halogen includes all four halogens.

Compounds of this invention can be prepared by a variety of methods. In one embodiment, an appropriate anthranilic acid or anthranilic acid lower alkyl ester is reacted with an α-halo-lower alkanoyl halide to form an intermediate of the formula

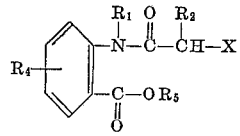
III wherein $R_1$, $R_2$ and $R_4$ have the same meaning as above; $R_5$ is selected from the group consisting of hydrogen and lower alkyl; and X is halogen.

These intermediates of Formula III are novel compounds and are within the scope of the instant invention. It should be noted that when an anthranilic acid is used as a starting material yielding as the product a compound of Formula III wherein $R_5$ is hydrogen, that said product can be esterified to yield a compound of Formula III wherein $R_5$ is lower alkyl. Also, the halogen represented by X can be any halogen, but bromine is preferred. In a second step of the reaction sequence the compound of Formula III above is reacted with a compound of the formula:

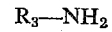
$$R_3\text{---}NH_2 \qquad \text{IV}$$

wherein $R_3$ has the same meaning as above.

This reaction directly yields compounds of the formula:

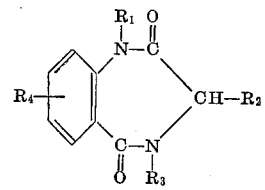
V wherein $R_1$, $R_2$, $R_3$ and $R_4$ have the same meaning as above.

In another embodiment of the invention an appropriate o-nitrobenzoic acid or lower alkyl ester thereof can be reacted with a lower alkyl ester of an α-amino acid to form a corresponding o-nitrohippuric acid lower alkyl ester, which can then be reduced to form the corresponding o-aminohippuric acid lower alkyl ester. This in turn can be reacted with piperidine to form the corresponding o-aminohippuric acid piperidide. The piperidide can then be hydrolyzed resulting in formation of the appropriate compound of Formula V above.

The compounds of Formula I and II above can be formed from compounds of Formula V by hydrogenation in the presence of a suitable hydrogenation catalyst, or by use of a suitable reducing agent such as, for example, lithium aluminum hydride.

Compounds of Formulas II, III and V wherein $R_1$ and/or $R_3$ is hydrogen can be converted into compounds wherein $R_1$ and/or $R_3$ is other than hydrogen by conventional means. For example, compounds wherein $R_1$ and/or $R_3$ is hydrogen can be alkylated with conventional alkylating agents such as, for example, lower alkyl halides. Also compounds wherein $R_1$ is hydrogen can be aryl-alkylated, for example, benzylated. Moreover, compounds of Formula V wherein $R_1$ is aryl-lower alkyl can be selectively hydrogenated to obtain compounds of Formula I wherein $R_1$ is, for example, cyclohexyl-lower alkyl. This hydrogenation can be effected in the presence of a suitable catalyst, for example, in the presence of palladium/carbon.

The compounds of Formula I–II above and their pharmaceutically acceptable acid addition salts are useful as anticonvulsants. They can be administered internally, for example, orally or parenterally, with dosage adjusted to individual requirements, in conventional pharmaceutical formulations, both solid and liquid, such as capsules, tablets, dragees, suppositories, suspensions, emulsions and the like. The compounds can, if desired, be in mixture with standard pharmaceutical carriers or adjuvants; and, if desired, other active ingredients.

The following examples are illustrative but not limitative of the invention. All temperatures are stated in degrees centigrade.

Example 1

To a stirred solution of 25 g. of N-methylanthranilic acid methyl ester and 13 ml. of pyridine in 1500 ml. of dry ether at 0°, 30.6 g. of bromoacetyl bromide was added dropwise, and stirring continued for 2 hours. The resulting suspension was filtered, and the filtrate evaporated. The residue was recrystallized from ether, yielding N-bromoacetyl-N-methylanthranilic acid methyl ester, M.P. 80–82°.

Example 2

A solution of 2 g. of N-bromoacetyl-N-methylanthranilic acid methyl ester in 500 ml. of methanol was saturated with ammonia gas. The temperature rose to the boiling point and the solution was left standing overnight at room temperature. After evaporation to dryness, water was added and the mixture extracted with methylene chloride. The extract was washed with water, dried and evaporated. The crystalline residue, recrystallized from acetone, yielded 1-methyl-3H-1,4-benzodiazepine-2,5(1H,4H)-dione, M.P. 190–191.5°.

Example 3

A solution of 3 g. of N-bromoacetyl-N-methylanthranilic acid methyl ester in 100 ml. of methanol was saturated with gaseous methylamine. The temperature rose to the boiling point. The solution was evaporated after standing overnight at room temperature. Water was added to the residue and the mixture was extracted with methylene chloride. The extract was washed with water, dried and evaporated. The crystalline residue was recrystallized from acetone-ether, yielding 1,4-dimethyl-3H-1,4-benzodiazepine-25(1H,4H)-dione, M.P. 144–146°.

Example 4

To solution of 25 g. of ethyl o-nitrohippurate in 1 liter of methanol, there was added 2.5 g. of 10% Pd/C catalyst, and the mixture hydrogenated at room temperature and normal pressure. After 3 mole-equivalents of hydrogen were absorbed, the reaction stopped. The catalyst was filtered off and the solution evaporated, giving crystalline ethyl o-aminohippurate, M.P. 152–153°.

Example 5

A solution of 15 g. of ethyl o-aminohippurate in 100 ml. of methanol and 100 ml. of piperidine was refluxed for 24 hours. After evaporation in vacuo, the sirupy residue was crystallized from acetone, giving o-aminohippuric acid piperidide, M.P. 125–126.

Example 6

A solution of 13 g. o-aminohippuric acid piperidide in 200 ml. of glacial acetic acid was refluxed for 4 hours. Upon addition of 200 ml. of water, 3H-1,4-benzodiazepine-2,5(1H,4H)-dione precipitated and was isolated by filtration, M.P. 327–328.5°.

Example 7

A solution of 20 g. of N-benzylanthranilic acid in 500 ml. of methanol saturated with hydrogen chloride was refluxed for 3 hours. The reaction mixture was then poured on ice, made alkaline with 3 N sodium hydroxide, extracted with methylene chloride, washed dried and evaporated, yielding N-benzylanthranilic acid methyl ester.

To a solution of 12.6 g. of N-benzylanthranilic acid methyl ester and 4.2 g. of pyridine in 500 ml. of ether, 10.6 g. of bromoacetyl bromide was added dropwise with stirring. The resulting suspension was stirred for an additional 2 hours, filtered and evaporated. The green sirupy N-bromoacetyl-N-benzylanthranilic acid methyl ester so-obtained was dissolved in 1 liter of methanol, and the solution then saturated at room temperature with ammonia. After 8 hours, the reaction mixture was evaporated and the residue crystallized from methylene chloride-ether, giving 1 - benzyl - 3H - 1,4 - benzodiazepin-2,5(1H,4H)-dione, M.P. 183–184°.

Example 8

To a solution of 3 g. of 1-benzyl-3H-1,4-benzodiazepin-2,5(1H,4H)-dione, in 300 ml. of glacial acetic acid, 300 mg. of 10% Pd/C catalyst was added, and the mixture hydrogenated for 48 hours at 60° and 60 p.s.i. The catalyst was filtered off, and the solution evaporated. The residue was crystallized from acetone, giving 3H-1,4-benzodiazepin-2,5(1H,4H)-dione, in all respects identical with the sample obtained by the method of Example 6 above.

Example 9

5.25 g. of 3H-1,4-benzodiazepin-2,5-(1H,4H)-dione was added to a solution of 750 mg. of sodium in 200 ml. of methanol, followed by addition of 200 ml. of dimethylformamide. The mixture was then evaporated in vacuum to dryness, the residue was dissolved in 100 ml. of dimethylformamide, and after the addition of 20 ml. of methyl iodide, the reaction mixture was stirred for two hours. Water was then added, and the excess of methyl iodide was evaporated off in vacuo. The resulting mixture was extracted with methylene chloride, the extract washed with water, dried and evaporated. The noncrystalline residue was chromatographed on alumina. The fractions with benzene were crystallized from acetone-ether, and gave 1,4-dimethyl-3H-1,4-benzodiazepin-2,5(1H,4H)-dione, M.P. 148.5–151.5°.

The fractions with 5% ethylacetate-benzene were crystallized from acetone, and gave 1-methyl-3H-1,4-benzodiazepin-2,5(1H,4H)-dione, M.P. 194–197°.

The products so obtained showed no depression of melting point when mixed with the same products prepared by the methods of Examples 3 and 2 above, respectively.

Example 10

The sirupy N - benzyl-N-bromoacetylanthranilic acid methyl ester, obtained from 12 g. of N-benzylanthranilic acid methyl ester by the method of Example 7 above, was dissolved in 1000 ml. of methanol, and the solution saturated with gaseous methylamine, whereupon the temperature rose to boiling. The mixture was left standing overnight at room temperature, then evaporated, diluted with water, and extracted with methylene chloride. The extract was washed with water, dried and evaporated. The residue crystallized from acetone-ether, and gave 1-benzyl-4 - methyl - 3H - 1,4 - benzodiazepin-2,5-(1H,4H)-dione, M.P. 150–151°.

Example 11

To a stirred solution of 15 g. of methyl anthranilate and 8 g. of pyridine in 500 ml. of anhydrous ether at 0°, 20 g. of bromoacetyl bromide was added dropwise. Stirring was continued for two hours at room temperature. The solution was then filtered and evaporated, and the residue recrystallized from hexane, giving N-bromoacetylanthranilic acid methyl ester, M.P. 86–87°.

Into a solution of 20 g. of N-bromoacetylanthranilic acid methyl ester in 1500 ml. of methanol, gaseous methylamine was introduced for 5 hours at 60°, and then the solution was evaporated. Water was added and the resulting mixture extracted with methylene chloride, the extract washed with water, dried and evaporated. Crystallization from acetone-ether, gave 4-methyl-3H-1,4-benzodiazepin-2,5(1H,4H)-dione, M.P. 248–252°.

Example 12

To a solution of 5.5 g. of N-bromoacetylanthranilic acid methyl ester in 200 ml. of acetone, 4 g. of potassium iodide was added and the reaction mixture stirred at room temperature for two hours. After dilution with a large excess of water, the precipitate was filtered off, washed with water and dried. It gave N-iodoacetylanthranilic acid methyl ester, M.P. 86–89°.

To a solution of 4.7 g. of N-iodoacetylanthranilic acid methyl ester in 120 ml. of methanol, 5.5 ml. of a methanolic solution containing 0.915 g. of methylamine (2 mole equivalents) was added. The mixture was left 2 days at room temperature, then refluxed 4 hours and evaporated. A large excess of water was added to the residue, the mixture was made acidic with acetic acid and extracted with methylene chloride. The extract was washed with water, dried and evaporated. The crystalline residue was boiled with ether, giving N-methylaminoacetylanthranilic acid methyl ester, M.P. 130–131.5°.

2.8 g. of N-methylaminoacetylanthranilic acid methyl ester was heated for one hour at 160° under vacuum. After cooling, the product was crystallized from acetone, giving 4 - methyl - 3H - 1,4 - benzodiazepin-2,5(1H,4H)-dione, M.P. 248–252°, infrared spectrum and mixed melting point show the product to be identical with the one obtained in Example 11 above.

Example 13

To a solution of 13.7 g. of anthranilic acid in 200 ml. of dimethylformamide, 20.2 g. of bromoacetyl bromide was added. The mixture was stirred for two hours, then diluted with water, the resultant crystals filtered off and dried; yielding N-bromoacetylanthranilic acid, M.P. 165.5–172°.

To a solution of 18 g. of N-bromoacetylanthranilic acid in 200 ml. of methanol, 200 ml. of ⅔ N methylamine in methanol was added. The mixture was left at room temperature for one week, then evaporated and the residue heated two hours at 190–200°. After cooling, water was added and the resultant mixture extracted in methylene chloride; and the extract dried and evaporated. The product was crystallized from acetone, giving 4-methyl-3H-1,4-benzodiazepin-2,5(1H,4H)-dione, M.P. 246–250°. Infrared spectrum and mixed melting point show the product to be identical with the one obtained in Examples 11 and 12 above.

Example 14

To a stirred solution of 25 g. of N-methylanthranilic acid methyl ester in 100 ml. of dimethylformamide at 0°, 35 g. of α-bromopropionyl bromide was added and stirring continued for 2 hours. The reaction mixture was diluted with 1000 ml. of methanol and then saturated with ammonia. After 4 days at room temperature, the crystallized part was filtered off, washed with methanol and dried. It gave dl-1,3-dimethyl-3H-1,4-benzodiazepin-2,5-(1H,4H)-dione, M.P. 253.5–255°.

In the same manner, but using methylamine instead of ammonia and recrystallizing the product from acetone, there was obtained dl-1,3,4-trimethyl-3H-1,4-benzodiazepin-2,5(1H,4H)-dione, M.P. 137–139°.

Example 15

To a stirred solution of 10 g. of N-benzylanthranilic acid methyl ester in 100 ml. dimethylformamide at 0° was added 40 g. of α-bromopropionyl bromide and stirring continued for 2 hours. The reaction mixture was diluted with water, and the resulting suspension extracted with methylene chloride. The extract was washed with water, dried over anhydrous sodium sulfate and evaporated. The residue was crystallized from acetone-hexane, giving N-benzyl-N-(α-bromopropionyl)anthranilic acid methyl ester, M.P. 73–75°.

A solution of 11.3 g. of N-benzyl-N-(α-bromopropionyl) anthranilic acid methyl ester in 1000 ml. of methanol was saturated with ammonia and left at room temperature for 24 hours. It was then diluted with a large excess of water and the resulting suspension extracted with methylene chloride. The extract was washed with water, dried and evaporated. The residue was chromatographed on an alumina column. The fractions eluted with 25% ethyl acetate in benzene were evaporated and the residue crystallized from acetone-ether. It gave dl-1-benzyl-3-methyl - 3H - 1,4 - benzodiazepin-2,5(1H,4H)-dione, M.P. 209–213°.

Example 16

To a solution of 7.52 g. of N-benzyl-N-(α-bromopropionyl) anthranilic acid methyl ester in 100 ml. of acetone, 4 g. of potassium iodide was added and the reaction mixture stirred overnight at room temperature. It was then diluted with water, extracted with methylene chloride, and the extract dried and evaporated. The residue was crystallized from ether-hexane, giving N-benzyl-N-(α-iodopropionyl)anthranilic acid methyl ester, M.P. 72–76°.

N-benzyl-N-(α-iodopropionyl)anthranilic acid methyl ester was processed in methanol with ammonia according to the method of Example 15 above, yielding dl-1-benzyl-3-methyl - 3H - 1,4 - benzodiazepin-2,5(1H,4H)-dione.

Example 17

A solution of 7 g. of N-benzyl-N-(α-bromopropionyl) anthranilic acid methyl ester in 1000 ml. of methanol was saturated at 60° with methylamine and left 72 hours at room temperature. It was then evaporated, water was added to the residue and the resulting mixture extracted with methylene chloride. The extract was washed with water, dried and evaporated. The residue was crystallized from ether, giving dl-1-benzyl-3,4-dimethyl-3H-1,4-benzodiazepin-2,5(1H, 4H)-dione, M.P. 137–139.5°.

Example 18

To a solution of 5.6 g. of dl-1-benzyl-3-methyl-3H-1,4-benzodiazepin-2,5(1H,4H)-dione in 300 ml. of glacial acetic acid, 0.5 g. of 10% palladium on carbon catalyst was added and the suspension hydrogenated at 60° and 1000 p.s.i. for 1 week. After filtration and evaporation, the crystalline residue was chromatographed on an alumina column. The fractions eluted with 10% ethyl acetate in benzene were evaporated, and the residue, recrystallized from acetone-ether, gave dl-1-cyclohexylmethyl-3-methyl-1,4-benzodiazepin-2,5(1H,4H)-dione, M.P. 184–186°.

The fractions eluted with 5% methanol in benzene were evaporated, and the residue recrystallized from methanol, yielding dl-3 - methyl-3H-1,4-benzodiazepin-2,5(1H,4H)-dione, M.P. 320.5–321°.

Example 19

The sirupy N-benzyl-N-bromoacetylanthranilic acid methyl ester, obtained from 8 g. N-benzylanthranilic acid methyl ester according to the procedure of Example 7 above, was dissolved in 500 ml. of methanol. To this solution was added 6 g. of n-butylamine, and the resulting mixture was boiled for 7 hours, then evaporated. Water was added to the residue and extracted with methylene chloride. The extract was washed with water, dried and evaporated. The oily residue was chromatographed on an alumina column. The fractions eluted with 80% benzene-20% hexane gave, after crystallization from ether-hexane, 1-benzyl - 4 - butyl-3H-1,4-benzodiazepin-2,5(1H,4H)-dione, M.P. 113–116.5°.

Example 20

Proceeding from 5-chloro-N-methylanthranilic acid methyl ester and using the procedures of Examples 1 and 2 above, 7-chloro - 1 - methyl-3H-1,4-benzodiazepine-2,5(1H,4H)-dione was prepared. Upon crystallization from methylene chloride-ether it melted at 171.5–173.5°.

Example 21

Proceeding from 5-chloroanthranilic acid and using the procedure of Example 13 above, 7-chloro-4-methyl-3H-1,4-benzodiazepine - 2,5(1H,4H) - dione was prepared. Upon crystallization from acetone-ether it melted at 253–255°.

Example 22

Proceeding from 5-chloro-N-methylanthranilic acid methyl ester and using the procedure of Examples 1 and 3 above, 7-chloro-1,4-dimethyl-3H-1,4-benzodiazepine-2,5(1H,4H)-dione was prepared. Upon crystallization from acetone-ether it melted at 182–183.5°.

Example 23

Proceeding from 4-chloro-N-methylanthranilic acid methyl ester and using the procedure of Examples 1 and 2 above, 8-chloro - 1 - methyl-3H-1,4-benzodiazepine-2,5(1H,4H)-dione was prepared. Upon crystallization from acetone-ether it melted at 210–211.5°.

Example 24

Proceeding from 4-chloro-N-methylanthranilic acid methyl ester and using the procedure of Examples 1 and 3 above, 8 - chloro-1,4-dimethyl-3H-1,4-benzodiazepine-2,5(1H,4H)-dione was prepared. Upon crystallization from acetone-ether it melted at 198–200°.

Example 25

Proceeding from 5-chloro-N-benzylanthranilic acid methyl ester and using the procedure of Examples 1 and 2 above, 7-chloro-1-benzyl-3H-1,4-benzodiazepine-2,5(1H,4H)-dione was prepared. Upon crystallization from acetone-ether is melted at 202–203°.

Example 26

Proceeding from N-(p-nitrobenzyl)-anthranilic acid methyl ester and using the procedure of Examples 1 and 2 above, 1-(p-nitrobenzyl)-3H-1,4-benzodiazepine-2,5(1H,4H)-dione was prepared. Upon crystallization from methanol it melted at 262–264°.

Example 27

Proceeding from N-(p-nitrobenzyl)-anthranilic acid methyl ester and using the procedure of Examples 1 and 3 above, 1-(p-nitrobenzyl)-4-methyl-3H-1,4-benzodiazepine-2,5(1H,4H)-dione was prepared. Upon crystallization from methanol it melted at 199–200°.

Example 28

To a suspension of 2 g. of lithium aluminum hydride in 400 ml. of absolute tetrahydrofuran, 2 g. of 3H-1,4-benzodiazepine-2,5(1H,4H)-dione was added at 0°. The reaction mixture turned green, and was refluxed for 1 hour. Slow addition of saturated aqueous sodium sulfate at 0° decomposed the excess of reagent and the complex of products, and when a clear solution was obtained, anhydrous sodium sulfate was added and the solution filtered off. After evaporation, methanol was added to the sirupy residue, a minor precipitate was filtered off, and the crystals were recrystallized from methanol, giving 1H-2,3-dihydro-1,4-benzodiazepine, M.P. 244–246°.

The evaporation of the methanolic mother liquors gave sirupy 1H-2,3,4,5-tetrahydro-1,4-benzodiazepine. It was dissolved in 10 ml. of methanol and ether saturated with hydrochloric acid was added causing precipitation of 1H-2,3,4,5 - tetrahydro - 1,4-benzodiazepine dihydrochloride, M.P. 243–244°, after recrystallization from methanol-acetone.

We claim:
1. A compound of the formula:

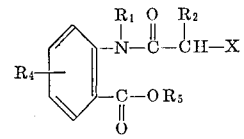

wherein $R_1$ is selected from the group consisting of hydrogen, lower alkyl, phenyl-lower alkyl, nitrophenyl-lower alkyl and cyclo-lower alkyl-lower alkyl; $R_2$ is selected from the group consisting of hydrogen and lower alkyl; $R_4$ is selected from the group consisting of hydrogen and halogen; $R_5$ is selected from the group consisting of hydrogen and lower alkyl; and X is halogen.

2. N-haloacetyl-N-methylanthranilic acid lower alkyl ester.
3. N-bromoacetyl-N-methylanthranilic acid methyl ester.
4. N-haloacetylanthranilic acid lower alkyl ester.
5. N-bromoacetylanthranilic acid methyl ester.
6. N-iodoacetylanthranilic acid methyl ester.
7. N-haloacetylanthranilic acid.
8. N-bromoacetylanthranilic acid.
9. N-benzyl-N-(α-halo-lower alkanoyl)-anthranilic acid lower alkyl ester.
10. N - benzyl-N-(α-bromopropionyl)-anthranilic acid methyl ester.

References Cited

UNITED STATES PATENTS 3,291,824  12/1966  Uskokovic et al. _____ 260—471

LORRAINE A. WEINBERGER, *Primary Examiner.*

L. A. THAXTON, *Assistant Examiner.*